Dec. 26, 1950 H. F. HOBBS 2,535,924
POWER TRANSMISSION APPARATUS
Filed July 3, 1946 4 Sheets-Sheet 4

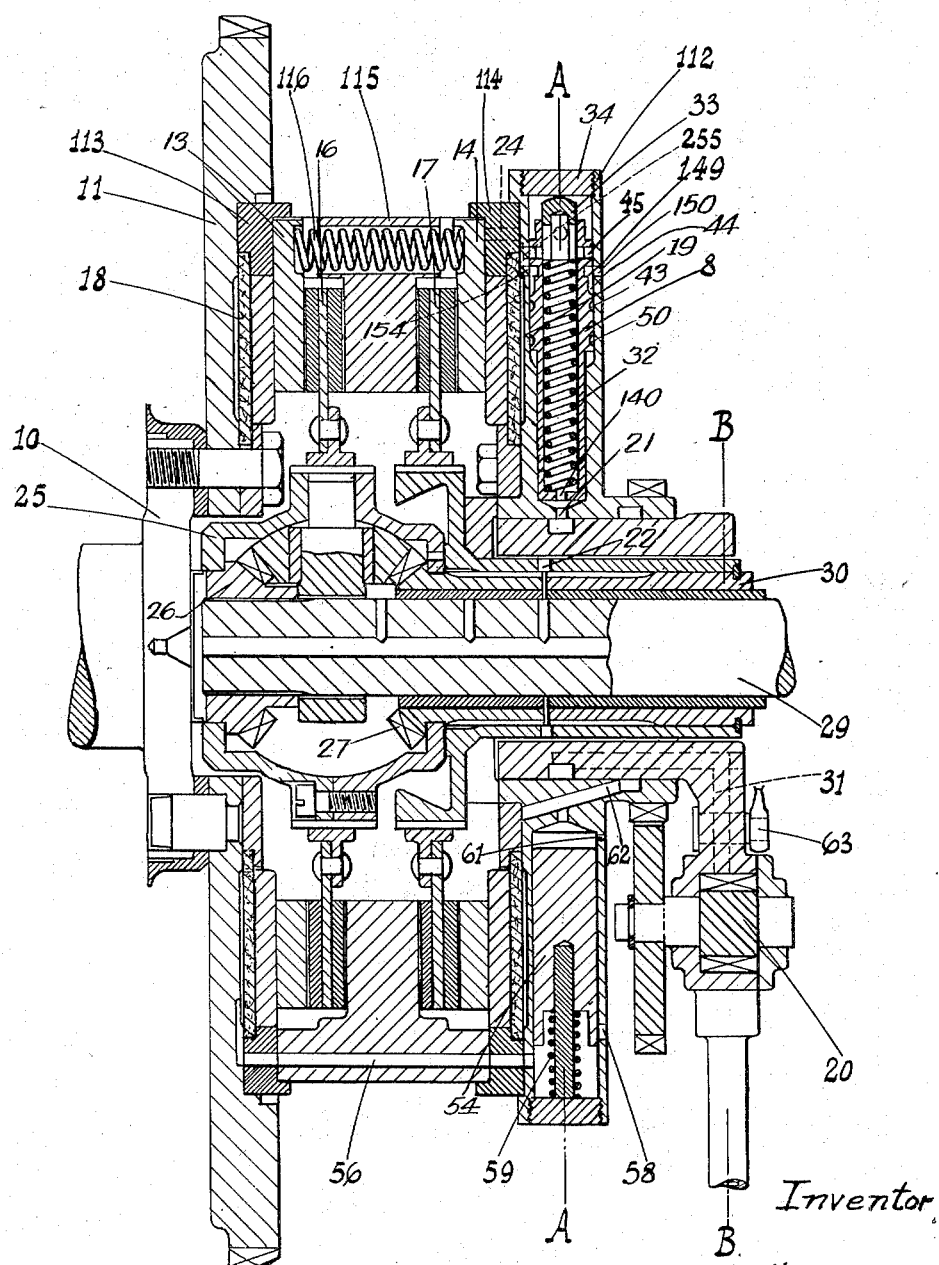

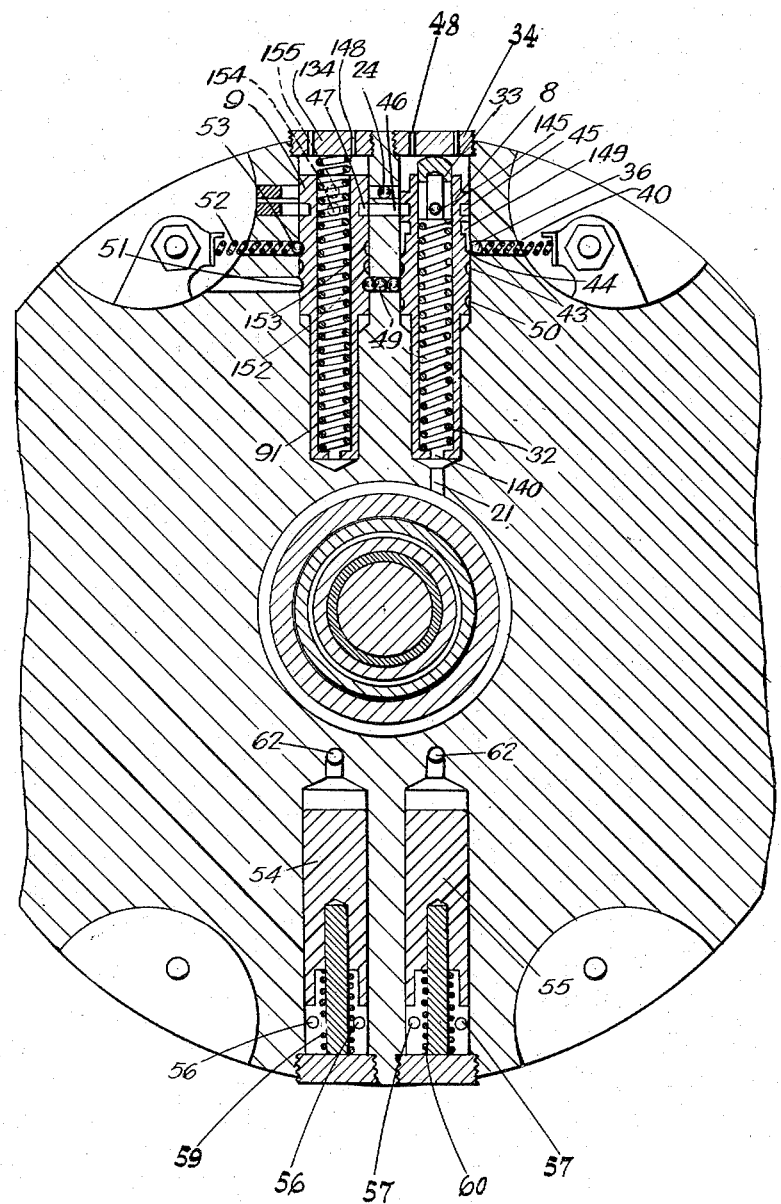

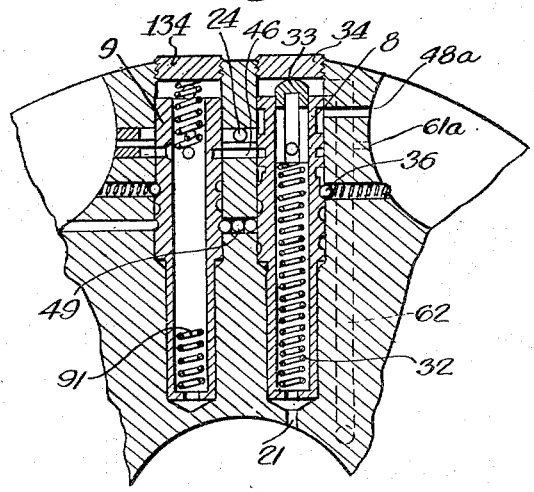
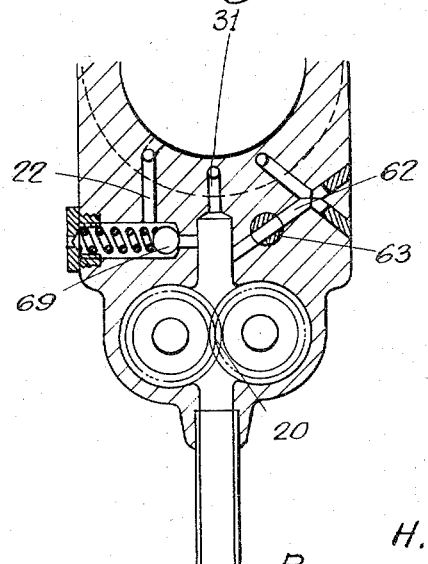

Inventor
H. F. Hobbs
By Young, Emery & Thompson
Attys.

Patented Dec. 26, 1950

2,535,924

UNITED STATES PATENT OFFICE 2,535,924

POWER TRANSMISSION APPARATUS

Howard Frederick Hobbs, Leamington Spa, England, assignor to Hobbs Transmission Limited Application July 3, 1946, Serial No. 681,321
In Great Britain July 9, 1945

9 Claims. (Cl. 74—330)

This invention relates to power transmission apparatus of the kind having at least two hydraulically actuated clutches provided with movable clutch engaging rings carried by a rotary part and spaces to receive fluid under pressure for actuating said rings and inlet and exhaust ports associated with said spaces and controllable by valve means.

The main object of the present invention is to provide an apparatus of this kind with valve device (or more than one) having a centrifugally movable piston and adapted for automatically changing drive from one clutch to another at suitable predetermined speeds of the rotary part, the speed at which said piston moves outwards being different from that at which it moves inwards.

Another object of the present invention is to provide a means whereby the operator can vary the operation of said device to cause it to effect change of ratio at different speeds.

According to the present invention an apparatus of the kind referred to is provided with at least one valve device carried by said rotary part which device has a valve piston which is held inwards by spring means and operated outwardly by centrifugal force, a spring pressed element also carried by said rotary part and acting on said valve piston to locate it in positions at the ends of its travel, ports being provided which are controlled by said piston for filling and exhausting the fluid spaces of the clutches whereby the clutches are engaged or disengaged when said piston is located in each of the two positions.

The provision of a spring pressed element in addition to the spring pressed and centrifugally operated piston ensures that the apparatus can be brought into only one or other of the aforesaid definite positions and the location of the exhaust ports and/or channels ensures permanent and complete exhausting of the fluid from a clutch or filling when required.

The change from one condition to another will occur at a predetermined degree of the centrifugal force on the piston, and consequently at a predetermined speed of the aforesaid rotary part, but the degree of force required for outward movement is more than that required for the inward movement of the valve piston.

The spring pressed element may consist of a spring pressed ball or detent acting on said piston to restrict its movement and locating into depressions.

In applying the invention to such an apparatus, it is necessary to ensure that the piston will move outwards at a greater speed of the said rotary part than the speed at which the piston moves inwards. Engagement of the appropriate clutches at different driving periods to bring different ratios into operation results in variation in the speeds of the rotary part, and the difference in the speeds required for outward and inward movements of the piston should be greater than the difference in speeds caused by the change in transmission ratio. This effect is achieved by using the aforesaid spring pressed detent and selecting the mass of the piston, the strength of the spring means operating on the piston, and the resistance against movement of the piston provided by the detent. Means may be provided whereby the operator can vary the speeds at which the said piston or pistons will change from one position to another.

The invention will now be described by way of example with reference to the accompanying drawings wherein—

Figure 1 is a vertical sectional view of an apparatus made in accordance with the invention;

Figure 2 is a sectional view on the line A—A on Figure 1;

Figure 3 is a view partly in section on the line B—B on Figure 1;

Figure 4 is a sectional view illustrating a modified construction of part of the apparatus.

Figure 5:
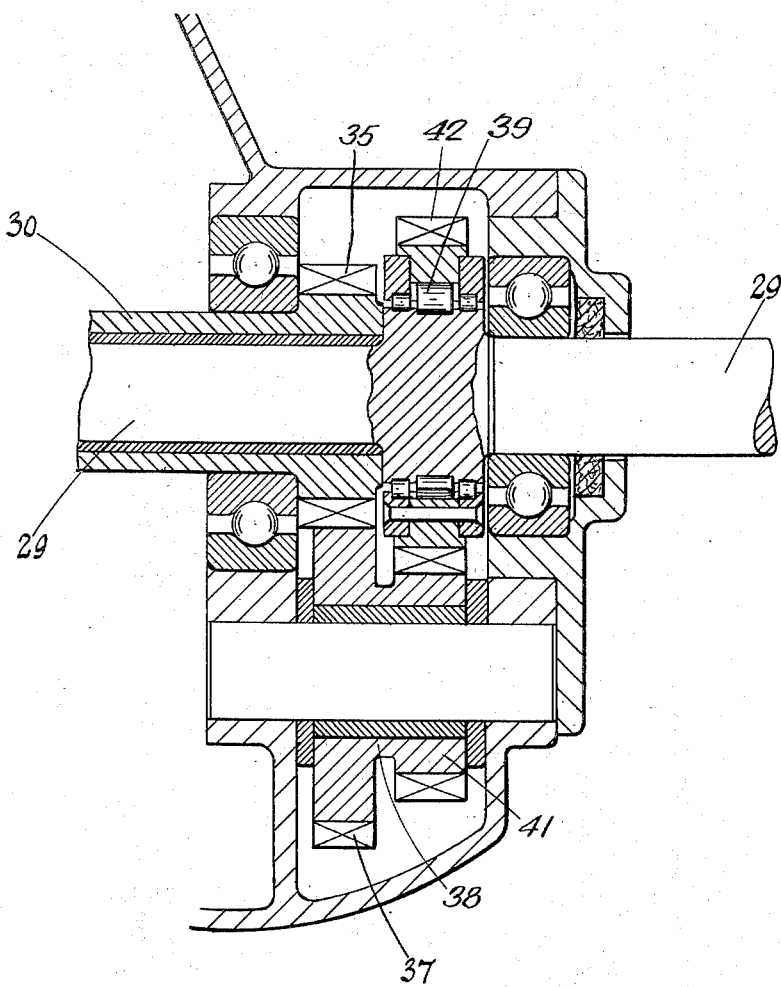
Figure 5 is a sectional view of a gearbox used with the said apparatus.

Referring first to Figures 1, 2, 3 and 5; the input shaft or engine crankshaft 10 carries the rotary part which takes the form of a housing comprising a front plate 11, rear plate 112, rings 113, 114 and drum 115. This housing contains and carries two clutch pressure rings 13, 14 which are pressed apart for clutch disengagement by springs 116, and two flexible diaphragms 18, 19, to one side of each of which is a space to which oil under pressure can be admitted whereby the pressure rings 13, 14 are caused to engage friction clutch plates 16, 17, respectively.

The clutch plate 16 is mounted on the cage 25 of a differential gear, the crown wheels 26, 27, of which are mounted respectively on two concentric intermediate shafts 29, 30. The clutch plate 17 is mounted directly on the shaft 30. The shaft 29 comprises also the mainshaft of the gearbox and the output shaft of the apparatus. The intermediate shaft 30 carries a gearwheel 35 (Figure 5) in mesh with a gearwheel 37 mounted on a layshaft 38. The layshaft 38 also carries another fixed gearwheel 41 in permanent mesh with a gearwheel 42 mounted on the mainshaft 29 and connected thereto by means of the freewheel or uni-directional roller clutch 39.

The apparatus provides three ratios as follows:

1. Clutch 17 engaged and transmission is effected through shaft 30, and gearwheels 35, 37, 41, 42, to the output shaft 29.

2. Clutch 16 engaged and transmission is effected through cage 25 to shafts 29, 30, simultaneously.

3. Both clutches are engaged which locks the differential gear thereby locking the shafts 29, 30, together and producing direct drive.

A neutral condition (both clutches disengaged) is also provided.

The oil to the spaces associated with the diaphragms is supplied by a pump 20 through a port 21 and suitable ducts such as 24. 69 is a relief valve for the pump.

The supply of oil is controlled automatically for producing the required ratios by suitable valves.

Two of these valves comprise the valve piston 8 and an additional valve piston 9 slidable in bores drilled in the housing plate 112 at right angles to its axis. These valves serve for automatically changing drive from one clutch to another at a predetermined speed of the rotary housing 11. Oil under pressure from the pump 20 reaches a port 21 via a duct 31 and is led to the inner end of the bore of the valve 8. The valve piston 8 is urged inwards by a spring 32 which acts between the base of the valve piston and a pin 33 which abuts against a plug 34 which is screwed into the mouth of the bore and has exhaust holes 48. The valve piston 9 is urged inwards by a spring 91, which acts between the base of the piston and a plug 134 which has exhaust holes 148.

The valve piston 8 has an opening 140 in its inner end through which oil reaches the interior of the piston. The piston 8 is provided with an annular port 45 at its outer end which port is in constant communication through a duct 145 with the interior of the piston. The valve piston 9 has a similar port 47. The ports 45, 47 of the valves 8, 9, are connected by ducts 24, 46. The duct 24 is in constant communication with the space associated with the diaphragm 18 through any suitable drillings (not shown), and the duct 46 can be connected at appropriate periods by an annular channel 47 in the valve member 9 to the space associated with the diaphragm 19.

The piston 8 also has an exhaust port 149, and the housing part 112 has an associate exhaust port 150.

With the pistons 8 and 9 in the positions shown the oil pressure is led through port 45, duct 46, port 47, in valve 9 and ducts 154 to the diaphragm 19, and the diaphragm 18 is open to exhaust through duct 24 and holes 48.

At some given rotary speed of the housing 11 the piston 8 will be in its inwards position and the apparatus will operate in the first ratio. The force from the spring 32 may be in excess of the centrifugal force tending to move the piston outwards. If the rotary speed of the housing 11 is suitably increased, the centrifugal force on the piston becomes sufficient to overcome the force from the spring, but the piston will not move outwards until the speed is still further increased and the centrifugal force increases sufficiently to overcome both the force from the spring 32 and the resistance of the ball 36 in the groove 44. The piston 8 will then move outwards and it abuts against the screwed plug 34 in which position pressure is led from the port 45 to the diaphragm 18, via the duct 24. The diaphragm 19 will exhaust through the ports and ducts, 154, 47, 46, and 150. This causes a change in driving ratio, i. e. from first to second and unless the vehicle, or other driven machine, changes its speed, the rotary speed of the housing 11 will vary in accordance with the change in driving ratio. If it were not for the ball detent 36 groove 44 and spring 40, the reduction in rotary speed would cause the piston 8 to move inwards and cause a change back to first ratio. The spring 40 ball 36 and groove 44 are so designed that the restraining force, relative to the centrifugal force on the piston and the force from the spring 32 is such that a still greater change in the rotary speed of the housing is required before the piston will move inwards.

When in the outward position, a suitable decrease in speed, which will be greater than that necessitated by change of one ratio to the next, will cause the force from the spring 32 to be sufficiently in excess of the centrifugal force on the piston 8 to overcome the resistance of the ball 36 and the groove 43, and the piston will return to its inner position where it abuts against the inner end of the cylindrical bore in which it operates. The change of drive ratio from second to first will cause some predetermined maximum increase in rotary speed of the housing 11 but the increase in speed required to cause the piston 8 to move outwards will be greater than this increase caused by change in ratio.

Variation of the strength of the spring 40, the mass of the piston 8 and spring 32 remaining the same, will cause the difference in the speeds required for outwards and inwards movement to be varied.

The spring pressed ball 36 serves to assist positioning in either the inner or outer position and to produce a suitable resistance to the valve piston 8.

The mass of the piston 8, the strength of the spring 32, and the resistance of the spring pressed ball 36, are so selected that the piston will move outwards at a greater speed of the housing 11 than the speed at which the piston moves inwards and that the difference in the speeds required for outward and inwards movements will be greater than the difference in speeds caused by the change in transmission ratio.

An apparatus constructed according to the invention may comprise only the valve 8 which will serve to cause engagement of either clutch 16 or 17. However, the apparatus being described provides three ratios and, the first is obtained with clutch 17 engaged and the second with clutch 16, whilst the third operates when both 17 and 16 are engaged together. The purpose of the valve 9 is to cause pressure to be supplied to both 16 and 17 together. In operation the valve 9 is similar to the valve 8 and the valve pistons are interlocked by the balls 49 and grooves 50, 51. With the valve pistons 8, 9, in the inner positions the balls 49 are moved to engage the groove 51. Hence the valve piston 9 cannot move outwards. On suitable increase in speed the valve piston 8 moves to its outer position as already described. The balls 49 can now be moved to engage the groove 50 so that the valve piston 9 is now able to move out when its suitable speed is reached. In this position, i. e. with both piston 8 and 9 in their outer positions, if the balls 49 are positioned in the groove 50 the piston 8 cannot move inwards until after the piston 9 has assumed its inner position.

With the piston 8 in the outer position, the oil pressure is led to diaphragm 18 and diaphragm 19 is open to exhaust through the groove 47 in the piston 9. If the valve member 9 moves to the outer position, the groove 47 now positions opposite to the duct 24 and the duct 46 is closed. Pressure, therefore, reaches both diaphragms 18 and 19 through ducts 155, 24, the ball 53 and spring 52 operating in a similar manner to ball 36 and spring 40.

Also mounted in the rotary housing part 112 are valves having piston members 54, 55. The bore of the valve 54 connects with the diaphragm 18 by means of one or more ducts 56 and the bore of the valve 55 connects with the diaphragm 19 by means of similar ducts 57. Oil pressure from the diaphragms can, therefore, act on the outer ends of these piston members. Exhaust ports 58 are provided for each valve 54 and 55. Springs 59, 60, press the valve piston members inwardly and below some given speed the springs 59, 60, are able to overcome the centrifugal force on the valve piston members so that they move inwards and uncover the exhaust ports 58. This allows any pressure in the diaphragm spaces to escape. At low speeds, therefore, the clutches 16, 17, are automatically disengaged owing to the valves 54, 55 being in the inner positions, but if speed is increased the centrifugal force on the valve pistons is first sufficient to overcome the force from the springs and then the oil pressure which also acts on the outer ends of the pistons. During initial increase in speed from idling condition, the pressure in the system is kept at suitable values, dependent on R. P. M., owing to the fact that this is determined by the centrifugal force on the valves.

Spaces at the inner end of the valves are provided with small openings 61 and these spaces are connected by ducts 62 and small rotary valve 63 to the delivery of the pump 20. The valve 63 may be connected to a foot pedal or hand lever. If the valve 63 is shut the action of the valves is dependent only on the centrifugal force on the valve, but if the rotary valve 63 is opened, some of the pressure from the pump will reach the spaces and this pressure will add to the centrifugal force, thus causing the valves to open and shut at lower R. P. M. With the valve 63 in a more or less open position the delivery of fluid will more or less overcome the exhaust through 61 and, therefore, provide a varying pressure in the spaces. Hence, by movement of the valve the speed at which the clutches engage can be varied.

As shown in Figure 4, a similar arrangement can be provided at the outer or inner ends of valves 8, 9. If, for example, there are no holes 48 and the exhaust from duct 24 is taken through an exhaust port 48a similar to 149 and a small opening 61a is provided in place of holes 48 and the duct 62 led to the spaces at the outer ends of valves 8 and 9, an additional force, depending more or less on the opening of the rotary valve 63, will then act on the outer ends of the valves 8, 9 so that the speed at which these operate can be varied according to the position of the rotary valve. This will however not affect any substantial variation of the relationship between the difference in speed required to operate the valves inwards and outwards and the difference in speed of the rotary housing brought about by the change in driving ratios.

Some oil from the pump 20 is allowed to reach the faces of the disengaged clutch surfaces, via duct 22. This together with a suitably sized duct 24 and the necessary range of pressures from pump 20, provides inherently progressive engagement. The oil on the faces cannot be removed and thus permit positive engagement without relative rotation and progressive action.

The operation of the apparatus described is as follows:

At low speeds the valves 8, 9, 54, 55 will be in the inner positions. On speeding up the input shaft 10, the valves 54, 55, will move to the outer positions and fluid pressure will act on the diaphragm 19 and engage the clutch 17, so that power is transmitted through the shaft 30 and gearwheels 35, 37, 41, 42, to the output shaft 29. On suitable increase in speed, valve 8 moves outwards thereby exhausting pressure from the diaphragm 19 and applying pressure to the diaphragm 18 so that the clutch 16 is engaged and power then passes via the cage 25 to both shafts 29, 30. The speed of the input shaft may fall on changing from one ratio to the next, but the valve 8 will not move inwards unless there is some considerable decrease in speed, because of the action of the ball 36 and spring 40.

On again increasing the speed of the input shaft, the valve 9 will move outwards and both clutches 16, 17, will be engaged. This will have the effect of locking the shafts 29, 30, together and the power will pass via the shaft 29, the gearwheel 42 freewheeling through the clutch 39. Similarly, if speed falls, valve 9 will first move inwards, causing clutch 16 to operate alone and as described. This may allow the input shaft to increase in speed, but the valve 9 would remain inwards unless there is some predetermined increase in speed, because of the action of spring 52 and ball 53.

If the arrangement includes a pressure varying device operating at the outer ends of valves 8, 9, then the speeds at which the changes occur can be varied, or a change caused when desired within certain limits of speed by variation of the position of rotary valve 63.

The apparatus, as shown with the variable pressure control to the inner ends of valves 54, 55, is suitable for a battery electric vehicle, although the rotary housing 11 is shown in the form of an engine flywheel.

Ducts similar to 62 may lead from a valve similar to 63 to the inner ends of the valves 8, 9.

Variation of pressure in this space by means of bleed holes such as 61 and a valve 63 will cause the speeds of operation of the valves to be varied.

To ensure rapid and complete emptying of the diaphragm spaces when required, the exhaust ports are associated therewith and channels which connect the ports to said spaces, and some parts or the whole of the ports and channels at each position along their whole length are located further from the axis of the rotary part than the outermost parts of said spaces.

The invention can be applied to internal combustion engine driven vehicles, battery electric vehicles, and other apparatus.

I claim:

1. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, at least one valve device carried by said first rotary member, a valve piston in said device, spring means for holding said piston inwardly and yielding outwardly by centrifugal force, a spring pressed element carried by said first rotary member and acting on said valve piston to locate it in positions at the ends of its travel, said valve device having ports which are controlled by said piston for filling and exhausting the said fluid spaces whereby the clutches are engaged or disengaged when said piston is located in each of its two positions.

2. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, at least one valve device carried by said first rotary member, a valve piston in said device, spring means for holding said piston inwardly and yielding outwardly by centrifugal force, a spring pressed element carried by said first rotary member and detents on said valve piston engageable with the spring pressed element to locate the piston in positions at the ends of its travel, said valve device having ports which are controlled by said piston for filling and exhausting the said fluid spaces whereby the clutches are engaged or disengaged when said piston is located in each of its two positions, the weight of the piston and the resistance of the spring means and the resistance against movement of the piston provided by the spring pressed element and the detent being so selected that (1) the piston moves out at a predetermined speed of the first rotary member greater than the speed of said member at which the piston moves inward and (2) the difference in speed required for outward and inward movements respectively of the piston is greater than the difference in speeds of said first rotary member caused by a change in transmission ratio.

3. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, at least one valve device carried by said first rotary member, a valve piston in said device, spring means for holding said piston inwardly and yielding outwardly by centrifugal force, a spring pressed element carried by said first rotary member and acting on said valve piston to locate it in positions at the ends of its travel, said valve device having ports which are controlled by said piston for filling and exhausting the said fluid spaces whereby the clutches are engaged or disengaged when said piston is located in each of its two positions, and means for varying the fluid pressure acting on the exposed area of the valve piston whereby the operator can vary the operation of the valve device to cause it to effect a change of driving ratio at a different speed of the first rotary member.

4. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, at least one valve device carried by said first rotary member, a valve piston in said device, spring means for holding said piston inwardly and yielding outwardly by centrifugal force, a spring pressed element carried by said first rotary member and detents on said valve piston engageable with the spring pressed element to locate the piston in positions at the ends of its travel, said valve device having ports which are controlled by said piston for filling and exhausting the said fluid spaces whereby the clutches are engaged or disengaged when said piston is located in each of its two positions, the weight of the piston and the resistance of the spring means and the resistance against movement of the piston provided by the spring pressed element and the detent being so selected that (1) the piston moves out at a predetermined speed of the first rotary member greater than the speed of said member at which the piston moves inward and (2) the difference in speed required for outward and inward movements respectively of the piston is greater than the difference in speeds of said first rotary member caused by a change in transmission ratio, and means for varying the fluid pressure acting on the exposed area of the valve piston whereby the operator can vary the operation of the valve device to cause it to effect a change of driving ratio at a different speed but without substantially varying the relationship between said speed differences.

5. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, a valve device carried by said first rotary member, two adjacent bores in said valve device, a piston located in each bore, one of which is associated with ports through which hydraulic pressure can be supplied in engaging one clutch at a time and another clutch at another time and the two of which are associated with ports through which hydraulic pressure can be supplied to one of the clutches at another time to enable pressure to be supplied to apply both clutches together, spring means for holding said pistons inwardly and yielding outwardly by centrifugal force, and spring pressed elements carried by the first rotary member and acting on said valve pistons to locate them in positions at the ends of their travel.

6. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, a valve device carried by said first rotary member, two adjacent bores in said valve device, a piston located in each bore, one of which is associated with ports through which hydraulic pressure can be supplied in engaging one clutch at a time and another clutch at another time and the two of which are associated with ports through which hydraulic pressure can be supplied to one of the clutches at another time to enable pressure to be supplied to apply both clutches together, spring means for holding said pistons inwardly and yielding outwardly by centrifugal force, spring pressed elements carried by the first rotary member and acting on said valve pistons to locate them in positions at the ends of their travel, and interlocking means between the valve pistons whereby one piston can only move inwardly or outwardly when the other is in a selected position, i. e. either inwards or outwards.

7. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, at least one valve device carried by said first rotary member, a valve piston in said device, spring means for holding said piston inwardly and yielding outwardly by centrifugal force, a spring pressed element carried by said first rotary member and acting on said valve piston to locate it in positions at the ends of its travel, said valve device having ports which are controlled by said piston for filling and exhausting the said fluid spaces whereby the clutches are engaged or disengaged when said piston is located in each of its two positions, and a pressure operated valve means for controlling the fluid pressure to one or more of the ports and ducts controlled by the valve piston whereby the valve piston opens pressure to or releases pressure from the pressure operated valve means, which means operates to open pressure to or release fluid from the said space.

8. A power transmission apparatus comprising a first rotary member, at least two hydraulically operated clutch engaging rings carried by said first rotating member, a second and a third rotary member, clutch members secured to each of the said second and third rotary members, said clutch engaging rings hyraulically engageable with the said clutch members, the first rotary member having spaces for receiving fluid under pressure for actuating said rings, a valve device carried by said first rotary member, two adjacent bores in said valve device, a piston located in each bore, one of which is associated with ports through which hydraulic pressure can be supplied in engaging one clutch at a time and another clutch at another time and the two of which are associated with ports through which hydraulic pressure can be supplied to one of the clutches at another time to enable pressure to be supplied to apply both clutches together, spring means for holding said pistons inwardly and yielding outwardly by centrifugal force, and spring pressed elements carried by the first rotary member and detents on said valve pistons engageable with the spring pressed elements to locate the pistons at the ends of their travel, the weight providing the centrifugal force on the pistons and the strength of the spring means and the resistance against movement of the piston provided by the spring pressed element and the detent being so selected that (1) each piston moves out at a predetermined speed of the first rotary member greater than the speed of said member at which the piston moves inward and (2) the difference in speed required for outward and inward movements respectively of the piston is greater than the difference in speeds of said first rotary member caused by a change in transmission ratio.

9. A power transmission apparatus comprising a first rotary member, at least two hydraulically operated clutch engaging rings carried by said first rotating member, a second and a third rotary member, clutch members secured to each of the said second and third rotary members, said clutch engaging rings hydraulically engageable with the said clutch members, the first rotary member having spaces for receiving fluid under pressure for actuating said rings, a valve device carried by said first rotary member, two adjacent bores in said valve device, a piston located in each bore, one of which is associated with ports through which hydraulic pressure can be supplied in engaging one clutch at a time and another clutch at another time and the two of which are associated with ports through which hydraulic pressure can be supplied to one of the clutches at another time to enable pressure to be supplied to apply both clutches together, spring means for holding said pistons inwardly and yielding outwardly by centrifugal force, and spring pressed elements carried by the first rotary member and detents on said valve pistons engageable with the spring pressed elements to locate the pistons at the ends of their travel, the weight providing the centrifugal force on the pistons and the strength of the spring means and the resistance against movement of the piston provided by the spring pressed element and the detent being so selected that (1) each piston moves out at a predetermined speed of the first rotary member greater than the speed of said member at which the piston moves inward and (2) the difference in speed required for outward and inward movements respectively of the piston is greater than the difference in speeds of said first rotary member caused by a change in transmission ratio, and means for varying the fluid pressure acting on the exposed area of the valve piston whereby the operator can vary the operation of the valve device to cause it to effect a change of driving ratio at a different speed but without substantially varying the relationship between said speed differences.

HOWARD FREDERICK HOBBS.

REFERENCES CITED

The following references are of record in the file of this patent:

UNITED STATES PATENTS

| Number | Name | Date |
|---|---|---|
| 2,075,404 | Nika | Mar. 30, 1937 |
| 2,386,217 | Kegresse | Oct. 9, 1945 |